(12) United States Patent
Winarski

(10) Patent No.: US 6,533,522 B1
(45) Date of Patent: Mar. 18, 2003

(54) BI-DIRECTIONAL MAGAZINE AND TRAYS FOR STORAGE MEDIA

(75) Inventor: Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 09/095,029

(22) Filed: Jun. 10, 1998

(51) Int. Cl.$^7$ ................................................. B65G 1/04
(52) U.S. Cl. ........................................ 414/280; 312/286
(58) Field of Search ....................... 414/222.07, 222.09, 414/225.01, 277, 280; 206/308.1, 308.3; 360/92; 312/283, 286, 287

(56) References Cited

U.S. PATENT DOCUMENTS

| | | | | |
|---|---|---|---|---|
| 2,740,682 A | * | 3/1956 | Keiper | 312/287 |
| 2,872,048 A | * | 2/1959 | Cooper | 312/286 |
| 4,036,381 A | * | 7/1977 | Nielsen et al. | 414/222.09 X |
| 4,462,742 A | * | 7/1984 | Hradel | 414/280 |
| 4,749,081 A | | 6/1988 | Carlson et al. | |
| 5,032,053 A | * | 7/1991 | Krieg | 414/280 X |
| 5,220,548 A | * | 6/1993 | Nakatsukasa et al. | 414/280 X |
| 5,228,016 A | | 7/1993 | Menke | 369/36 |
| 5,345,350 A | * | 9/1994 | Ellis et al. | 360/92 |
| 5,460,476 A | | 10/1995 | Gazza | 414/807 |
| 5,537,268 A | * | 7/1996 | Felde et al. | 360/92 |
| 5,601,391 A | | 2/1997 | Gazza | 414/280 |
| 5,602,821 A | * | 2/1997 | McPherson et al. | 414/280 X |
| 5,607,275 A | * | 3/1997 | Woodruff et al. | 414/277 X |
| 5,659,440 A | * | 8/1997 | Acosta et al. | 360/92 |
| 5,867,458 A | * | 2/1999 | Barkley et al. | 360/92 X |
| 5,908,118 A | * | 6/1999 | Tyler | 206/308.1 X |

FOREIGN PATENT DOCUMENTS

| | | | | |
|---|---|---|---|---|
| DE | 2210818 | | 9/1973 | |
| JP | 61-150907 | * | 7/1986 | 414/277 |
| JP | 61-150908 | * | 7/1986 | 414/277 |

OTHER PUBLICATIONS

IBM® Technical Disclosure Bulletin, 37(06B):51–53 (Jun. 1994).

IBM® Technical Disclosure Bulletin, 38(11):455–459 (Nov. 1995).

\* cited by examiner

Primary Examiner—James W. Keenan
(74) Attorney, Agent, or Firm—Altera Law Group, LLC

(57) ABSTRACT

Bi-directional magazine and trays are disclosed. The bi-directional magazine and trays are used in double-picker automated storage library in which the double-pickers can never collide. The bi-directional magazine enables a double-picker to retrieve storage cartridges from either side of a magazine. The bi-directional magazine includes a tray for supporting a storage device removably mounted in a magazine, the storage tray being removable from a first end of the magazine and from a second end of the magazine, opposite from the first end. The storage tray may include a plurality of such storage trays. Each tray includes an engagement configuration on opposing ends of the tray for engaging with a picker mechanism for allowing the picker mechanism to pull the tray from the magazine at the first end or the second end of the magazine. The bi-directional magazine further includes a retention device for retaining the tray within the magazine, a magazine engagement device for allowing a picker mechanism to remove the magazine from the storage bin, and a bin engagement device for retaining the magazine in stationary relationship with the storage bin.

25 Claims, 4 Drawing Sheets

BI-DIRECTIONAL MAGAZINE AND TRAYS FOR STORAGE MEDIA

BACKGROUND OF THE INVENTION

1. Field of the Invention

This invention relates in general to a data storage, and more particularly to a bi-directional magazine and trays for storage media.

2. Description of Related Art

Automated data storage libraries provide a data storage environment in which large quantities of data are distributed between a plurality of discrete data storage elements, such as magnetic tape or optical disk cartridges, which are placed in addressable storage cell locations. The addressable storage cell locations may be arranged-in more than one storage cell banks. The storage elements are accessed using positionable cartridge picker mechanisms which may include one or more selectively activatable cartridge grippers.

In order to transport a data storage element between storage cell locations, one of which may contain a data read/write unit in communication with a host data processing system, a picker mechanism is first positioned at a source storage cell containing a data storage element to be retrieved. A gripper is activated to engage the storage element an d retract it from the storage cell. The picker mechanism is positioned at a destination cell and the gripper is again activated to insert the storage element in the storage cell and release it.

Storage cells may be located parallel to and opposite a storage device. In this case, it is desirable for a picker to retrieve a cartridge from the storage cell, pass the cartridge through the structure of the picker mechanism, and transfer the cartridge to the storage device. U.S. Pat. No. 5,460,476, issued Oct. 24, 1995 to Jack M. Gazza, assigned to International Business Machines Corporation, and incorporated by reference herein, discloses a picker having the capability to retrieve cartridges from storage cells that are located both opposite and adjacent to the storage device. The pass-through picker design allows a fore gripper to grasp a storage cartridge, feed the cartridge through to an aft gripper, release, and then allow the aft gripper to grip and pass the storage cartridge to the storage slot.

In this way, a special priority cell of the storage cells, directly across from the storage slot, can very quickly pass a priority storage cartridge directly to the storage device without moving the pass-through picker assembly. However, where multiple pickers are used to decrease the access time, the two pickers servicing the mount requests may possibly collide in their efforts to retrieve storage cartridges according to the mount requests.

It can be seen then that there is a need for a double-picker automated storage library in which the double-pickers can never collide.

It can also be seen that there is a need for a bi-directional magazine which holds a plurality of trays enabling the double-picker to retrieve storage cartridges from either side of a magazine.

SUMMARY OF THE INVENTION

To overcome the limitations in the prior art described above, and to overcome other limitations that will become apparent upon reading and understanding the present specification, the present invention discloses a double-picker automated storage library in which the double-pickers can never collide.

The present invention solves the above-described problems by providing a bi-directional magazine which holds a plurality of trays enabling the double-picker to retrieve storage cartridges from either side of a magazine.

A system in accordance with the principles of the present invention includes a tray for supporting a storage device removably mounted in a magazine, the storage tray being removable from a first end of the magazine and from a second end of the magazine, opposite from the first end.

Other embodiments of a system in accordance with the principles of the invention may include alternative or optional additional aspects. One such aspect of the present invention is that the storage tray includes a plurality of storage trays.

Another aspect of the present invention is that the tray includes an engagement configuration on opposing ends of the tray for engaging with a picker mechanism for allowing the picker mechanism to pull the tray from the magazine at the first end or the second end of the magazine.

Another aspect of the present invention is that the system further includes a retention device for retaining the tray within the magazine.

Another aspect of the present invention is that the system further includes a magazine engagement device for allowing a picker mechanism to remove the magazine from the storage bin.

Another aspect of the present invention is that the system further includes a bin engagement device for retaining the magazine in stationary relationship with the storage bin.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a double-picker automated storage library in which the double-pickers can never collide. The automated storage library uses a bi-directional magazine which holds a plurality of trays enabling the double-picker to retrieve storage cartridges from either side of a magazine to prevent collisions between the pickers.

Figure 1:
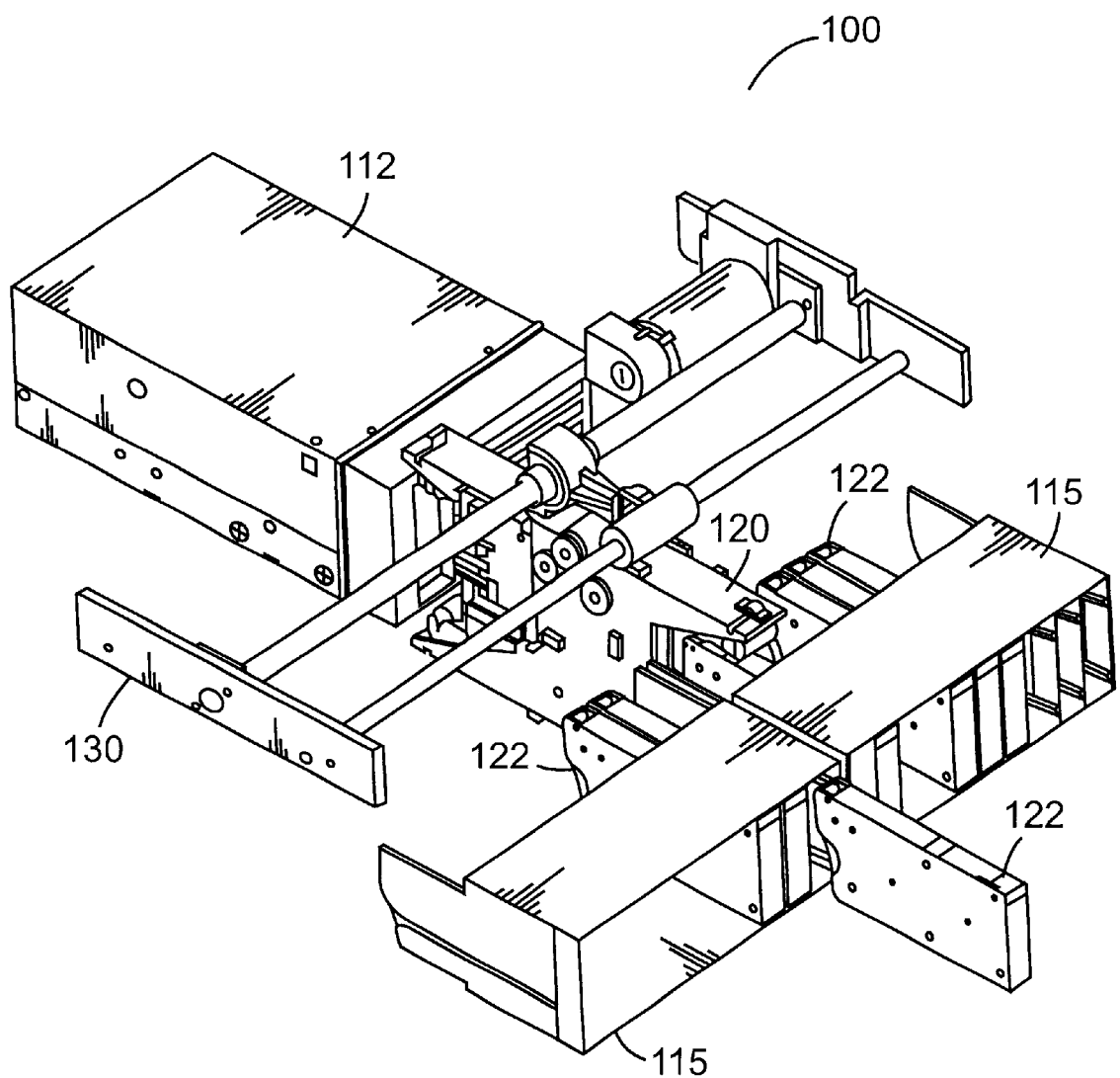
FIG. 1 illustrates an automated storage system for managing removable media.

FIG. 1 illustrates an automated storage system 100 for managing removable media, for example magnetic tapes or digital versatile discs (DVDs). At least one storage device 112 is located across from and parallel to a magazine 115. The picker assembly 120 transports a cartridge or tray 122 from the magazine 115 to a storage slot in the storage device 112. The picker assembly 120 is attached to an accessor 130 that translates the picker assembly 120 parallel to the storage device 12 and magazine 115.

Figure 2:
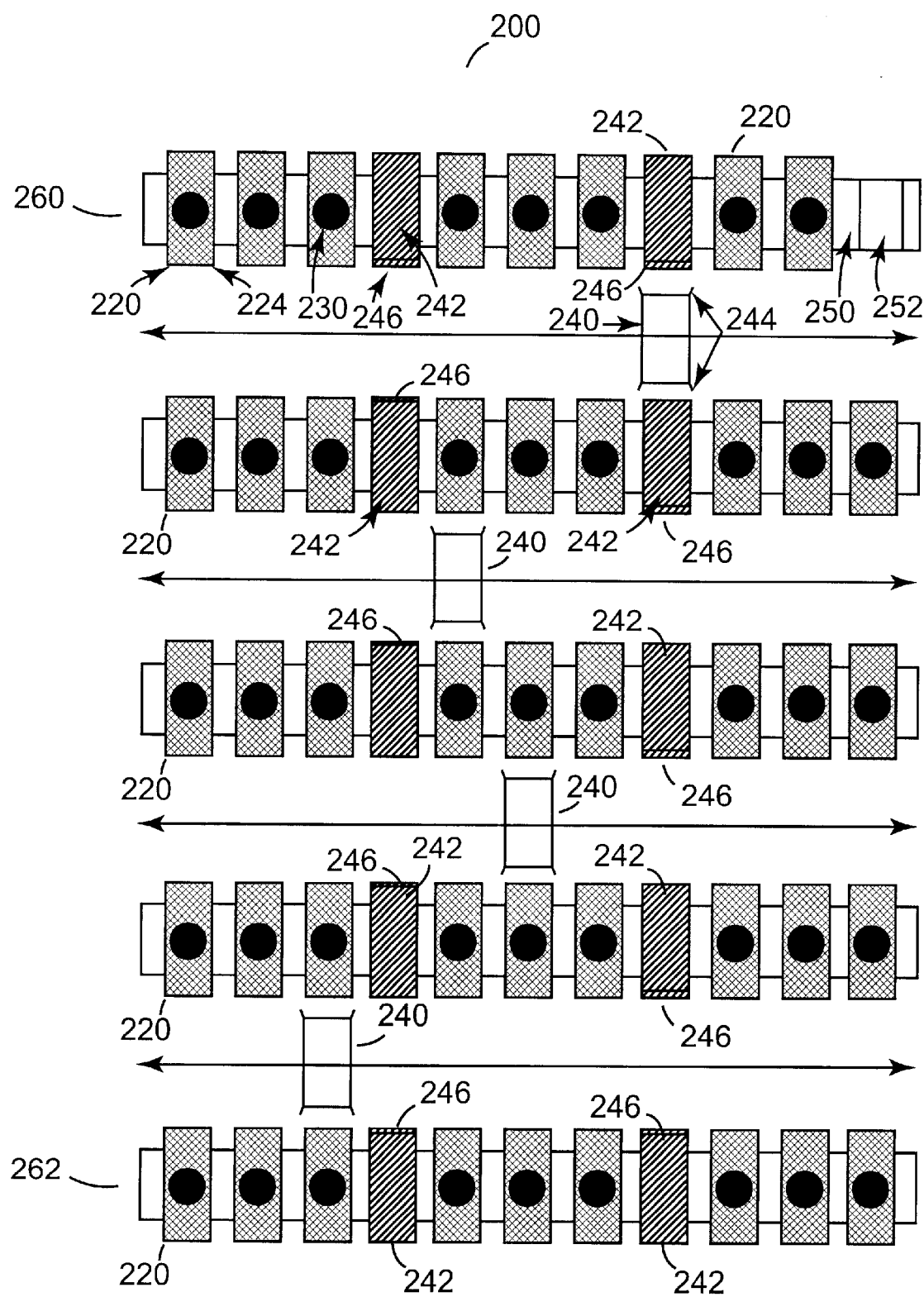
FIG. 2 illustrates an automated library system according to the invention.

FIG. 2 illustrates an automated library system 200 according to the invention. In FIG. 2, a plurality of bi-directional magazines 220 hold a plurality of trays 224, whereby each tray contains a disk of removable media 230. The magazines 220 and trays 224 are each removable by robotic pickers 240, to be taken to drives 242 for I/O activity and then returned to their storage slots 250 after the I/O activity. Each picker 240 may take trays 224 or magazines 220 from either of its ends 244 and transport those individual trays 224 or magazines 220 to drives 242 from either of its ends 242. The drives 244 accept the trays 224 or magazines 220 at openings 246. Except for the top and bottom rows 260, 262, openings 246 alternate in the library 200, enabling pickers 240 to access drives 242, magazines 220, and trays 224 from either end 244 of the picker 240 without need to rotate the picker mechanism 240.

As mentioned above, one possible design of this picker 240 is disclosed in U.S. Pat. No. 5,460,476 issued Oct. 24, 1995 to Jack M. Gazza, and assigned to International Business Machines Corporation. Another example of a dual gripper picker assembly 240 is disclosed in U.S. Pat. No. 5,601,391 issued on Feb. 11, 1997 to Jack M. Gazza, assigned to International Business Machines Corporation, and which is incorporated by reference herein. These two patents show a dual gripper bi-directional robotic picker 240 which can pick up removable media from either end of its openings 246 and deposit that media in storage slots 250 or I/O drives 242 from either end 244. These pickers 240 could be designed with grabbing hooks at each end 244 of the picker 240, as an alternative to the pinching rollers at each end. However, the pinching roller concept is preferred.

To implement both the picking of individual trays 224 and whole magazines 220, two pickers 240 would be needed and could ride piggyback (not shown). One picker 240 would be thin, for trays 224, and the other would be thicker, for the magazines 220. According to the present invention, either trays 224 or whole magazines 220 of DVD media could be serviced to drives 242, storage slots 250, or mail-slots 252. Mail-slots 252 are for importing/exporting media to/from the library 200 itself.

Those skilled in the art will recognize that bi-directional media does not have to be rotated in the mail-slot 252. Additionally, the bi-directional pickers 240 can move trays 224 and magazines 220 between storage slots 250, in order to balance the workload within the library 200. This is called "pass-through."

Figure 3:
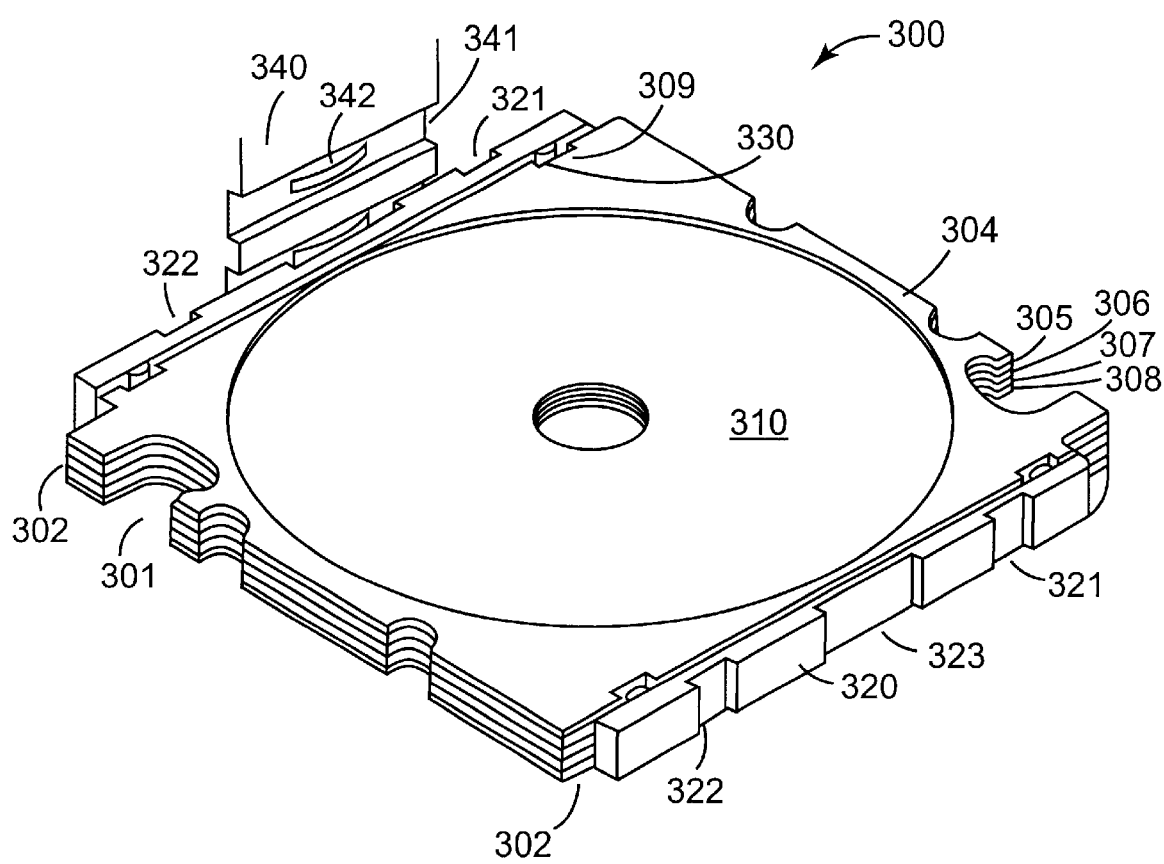
FIG. 3 shows the bi-directional magazine and tray system according to the present invention.

FIG. 3 shows the bi-directional magazine and tray system 300 according to the present invention. In FIG. 3, each magazine 320 has a plurality of trays 304, 305, 306, 307, 308. Furthermore, each tray is capable of holding storage media 310, e.g., a DVD disk, and each tray has either slots 301 and/or exposed side edges 302 or other engagement configuration on each of opposing ends so that a storage drive or picker can pull individual trays out of the magazine from either end of the magazine.

Retention devices may be used to retain the trays 304–308 within the magazine 320. For example, the retention devices may include slots 309 and lightly spring-loaded protuberances 330 to enable the trays to be secured within the magazine 320. Lightly spring-loaded protuberances 330 in the magazine 320 engage the slots 309 to keep the trays from sliding out either end of the magazine 320, due to the weight of each tray 304–308 and DVD disk 310, but will release the tray to an awaiting drive or picker for the loading of a DVD disk. Those skilled in the art will recognize that DVD disk is used herein for illustration only and is not meant to limited the bi-directional magazine to a particular type of storage media. For example, the trays 304–308 may hold other storage media such as phase change (PC), magneto-optical (MO), compact disk-read only memory (CD-ROM), compact disk-recordable (CD-R) or compact disk-rewritable (CD-RW).

A magazine engagement device may be utilized by a picker to remove a complete magazine 320. For example, a magazine 320 may have a pair of slots 321 at one end and a similar pair of slots 322 at the other end so that an automated picker could grasp the entire magazine and pull it from storage bins 340. Further, bin engagement devices are used to secure each magazine 320 to storage bins 340. For example, each magazine has one pair of slots 323 which interact with spring loaded protuberances 342 in each groove 341 of storage bins 340. These lightly spring-loaded protuberances also act to retain the magazine in the storage bins but will release the entire magazine to an awaiting robotic picker.

Figure 4:
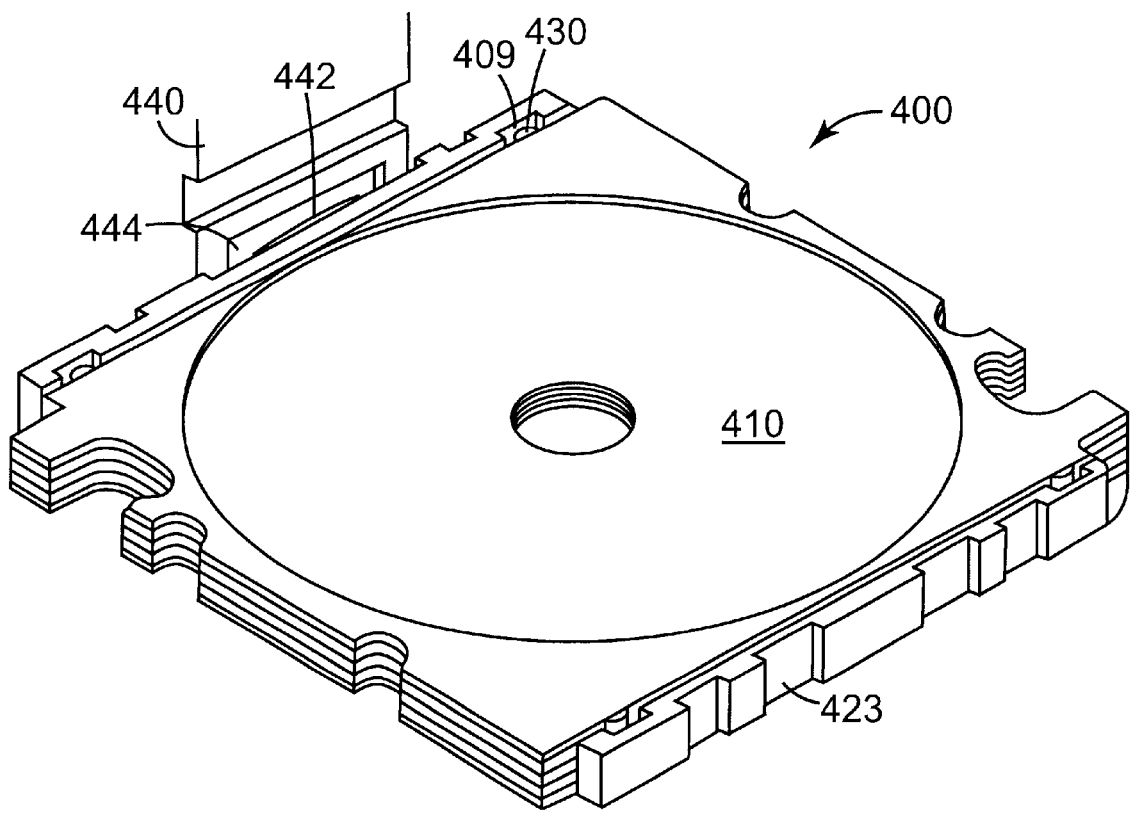
FIG. 4 illustrates a second embodiment of the bi-directional magazine and tray system according to the present invention.

Those skilled in the art will recognize that other engagement configurations, retention devices, magazine engagement device and bin engagement devices may be provided within the scope of the present invention. Further, those skilled in the art will recognize that the arrangement of slots 423 and spring-loaded proturbances 442 could be reversed as shown in FIG 4. Spring-loaded protuberances 430 in the trays engage slots 409 in the magazine 400 for removably securing the storage trays within the magazine 400. Further, a pair of slots 444 in the storage bin 440 interact with spring loaded protuberances 442 in the magazine to releasably retain the magazine 400 in the storage bins 440.

In FIG. 3, a robotic picker could seize magazine 320 from one end or a different robotic picker could seize the same magazine from the other end. Thus, there could be two robotic pickers, one on each side of storage bins 340, to service mount requests of a plurality of magazines.

In summary, the present invention provides an automated library system having a plurality of bi-directional magazines holding a plurality of trays, whereby each tray contains a disk of removable media. the bi-directional magazines enable two pickers to retrieve storage cartridges from a single magazine without the occurrence of collisions between pickers since each picker is on opposite sides of the storage bins.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A bi-directional magazine for a storage bin of a data storage library, comprising at least one storage tray for supporting a data storage device removably mounted in a removable magazine, the at least one storage tray being removable from a first end of the magazine and from a second end of the magazine, opposite from the first end, and the magazine being removable from a first end of the bin and from a second end of the bin, opposite from the first end.

2. The bi-directional magazine of claim 1 wherein the at least one storage tray comprises a plurality of storage trays.

3. The bi-directional magazine of claim 1 wherein the at least one storage tray comprises an engagement configuration on opposing ends of the at least one storage tray for engaging with a picker mechanism for allowing a first picker mechanism to pull the at least one storage tray from the magazine at the first end or a second picker mechanism to pull the tray from the magazine at the second end of the magazine.

4. The bi-directional magazine of claim 3 wherein the engagement configuration comprises slots.

5. The bi-directional magazine of claim 1 further comprising a retention device for retaining the at least one storage tray within the magazine.

6. The bi-directional magazine of claim 5 wherein the retention device further comprises lightly spring-loaded protuberances in the magazine engaging slots in the at least one storage tray for removably securing the at least one storage tray within the magazine.

7. The bi-directional magazine of claim 5 wherein the retention device further comprises lightly spring-loaded protuberances in the at least one storage tray engaging slots in the magazine for removably securing the at least one storage tray within the magazine.

8. The bi-directional magazine of claim 1 further comprising a magazine engagement device for allowing a picker mechanism to remove the magazine from the storage bin.

9. The bi-directional magazine of claim 8 wherein the magazine engagement device farther comprises a pair of slots at one end of the magazine and a similar pair of slots at the other end of the magazine for engagement by a picker mechanism to allow the picker to pull the magazine from the storage bin.

10. The bi-directional magazine of claim 1 further comprising a bin engagement device for retaining the magazine in stationary relationship with the storage bin.

11. The bi-directional magazine of claim 10 wherein the bin engagement device further comprises a pair of slots in the magazine interacting with spring loaded protuberances in a groove of the storage bin, the spring-loaded protuberances acting to releasably retain the magazine in the storage bins.

12. The bi-directional magazine of claim 10 wherein the bin engagement device further comprises a pair of slots in the storage bin interacting with spring loaded protuberances in a magazine, the spring-loaded protuberances acting to releasably retain the magazine in the storage bins.

13. An automated storage library, comprising:

a first storage bin, the first storage bin comprising a bi-directional magazine;

a second storage bin, disposed opposite to the first storage bin; the second storage bin comprising a bi-directional magazine; and an automated double picker, disposed between the first and second storage bins, for accessing storage media supported by the bi-directional magazines;

wherein the bi-directional magazines comprise at least one storage tray for supporting a data storage device removably mounted in a removable magazine, the storage tray being removable from a first end of the magazine and from a second end of the magazine, opposite from the first end, and the magazine being removable from a first end of a storage bin and from a second end of a storage bin, opposite from the first end.

14. The automated storage library of claim 13 wherein the at least one storage tray comprises a plurality of storage trays.

15. The automated storage library of claim 13 wherein the at least one storage tray comprises an engagement configuration on opposing ends of the at least one storage tray for engaging with automated double pickers for allowing a first automated double picker to pull the at least one storage tray from the magazine at the first end or a second automated double picker to pull the tray from the magazine at the second end of the magazine.

16. The automated storage library of claim 15 wherein the engagement configuration comprises slots.

17. The automated storage library of claim 13 further comprising a retention device for retaining the at least one storage tray within the magazine.

18. The automated storage library of claim 17 wherein the retention device further comprises lightly spring-loaded protuberances in the magazine engaging slots in the at least one storage tray for removably securing the at least one storage tray within the magazine.

19. The automated storage library of claim 17 wherein the retention device further comprises lightly spring-loaded protuberances in the at least one storage tray engaging slots in the magazine for removably securing the at least one storage tray within the magazine.

20. The automated storage library of claim 13 further comprising a magazine engagement device for allowing the automated double picker to remove the magazine from the storage bin.

21. The automated storage library of claim 20 wherein the magazine engagement device further comprises a pair of slots at one end of the magazine and a similar pair of slots at the other end of the magazine for engagement by the automated double picker to allow the automated double picker to pull the magazine from the storage bin.

22. The automated storage library of claim 13 further comprising a bin engagement device for retaining the magazine in stationary relationship with the storage bin.

23. The automated storage library of claim 22 wherein the bin engagement device further comprises a pair of slots in the magazine interacting with spring loaded protuberances in a groove of the storage bin, the spring-loaded protuberances acting to releasably retain the magazine in the storage bins.

24. The automated storage library of claim 22 wherein the bin engagement device further comprises a pair of slots in the storage bin interacting with spring loaded protuberances in a magazine, the spring-loaded protuberances acting to releasably retain the magazine in the storage bins.

25. An automated storage library, comprising:

a first storage bin, the first storage bin comprising a bi-directional magazine;

a second storage bin, disposed opposite to the first storage bin; the second storage bin comprising a bi-directional magazine;

a third storage bin, disposed opposite to the second storage bin, the third storage bin comprising a bi-directional magazine;

a first automated double picker, disposed between the first and second storage bins, for accessing storage media supported by the bi-directional magazines in the first and second storage bins; and a second automated double picker, disposed between the second and third storage bins, for accessing storage media supported by the bi-directional magazines in the second and third storage bins;

wherein the bi-directional magazines comprise at least one storage tray for supporting a data storage device removably mounted in a removable magazine, the at least one storage tray being removable from a first end of the magazine and from a second end of the magazine, opposite from the first end, the magazine being removable from a first end of a storage bin and from a second end of a storage bin, opposite from the first end, and wherein the bi-directional magazine allows the first and second automated double pickers to simultaneously access a bi-directional magazine without the first and second automated double pickers colliding.

\* \* \* \* \*